(12) United States Patent
Fauvarque et al.

(10) Patent No.: US 6,944,339 B2
(45) Date of Patent: Sep. 13, 2005

(54) MPEG-4 BINARY SHAPE TRANSMISSION

(75) Inventors: Gregory Fauvarque, St Maur des Foesés (FR); Philippe Daubigne, Yerres (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 949 days.

(21) Appl. No.: 09/855,627

(22) Filed: May 15, 2001

(65) Prior Publication Data

US 2002/0051076 A1 May 2, 2002

(30) Foreign Application Priority Data

May 18, 2000 (EP) .............................................. 00401368

(51) Int. Cl.⁷ ................................................ G06K 9/34
(52) U.S. Cl. ..................... 382/173; 382/180; 348/390.1
(58) Field of Search ................................ 382/173, 180, 382/164, 165; 348/385.1, 387.1, 390.1

(56) References Cited

U.S. PATENT DOCUMENTS 5,786,855 A * 7/1998 Chen et al. ............... 348/391.1
6,480,626 B1 * 11/2002 Venable ...................... 382/180

* cited by examiner

*Primary Examiner*—Thomas D. Lee

(57) ABSTRACT

The present invention relates to a method of processing a digital video data signal (DVS) in order to insert binary shape data into the digital video data signal. Such a method is used for processing the digital video data signal containing data relating to rectangular pictures, and segmented video data signals (SVS) provided by a segmentation step (SEG) of the digital video data signal, a segmented video data signal containing a video object (VO) which is a region of the rectangular picture. Said method of processing comprises the steps of identifying (ID) with an identifier to which video object of the segmented video data signals (SVS) a pixel of the rectangular picture belongs, inserting (INS) the identifiers into the digital video data signal so as to form a modified digital video data signal (DVSm), and encoding (ENC) the modified digital video data signal using a video-object-based encoding framework so as to obtain an encoded data signal (ES).

5 Claims, 2 Drawing Sheets

MPEG-4 BINARY SHAPE TRANSMISSION

FIELD OF THE INVENTION

The present invention relates to a method of processing a digital video data signal containing data relating to rectangular pictures, said method of processing comprising a segmentation step for segmenting the digital video data signal so as to provide segmented video data signals, a segmented video data signal containing a video object which is a region of the rectangular picture. The present invention also relates to a device corresponding to said processing method.

Such a method of processing may be used, for example, for encoding a digital video data signal using a video-object-based encoding framework, such as the MPEG-4 encoding standard.

BACKGROUND OF THE INVENTION

A video-object-based encoding framework, such as the MPEG-4 encoding standard, referred to as MPEG-4 Visual Version 1, ISO/IEC 14496-2, allows video objects having various shapes to be encoded instead of the whole rectangular picture. Rectangular pictures are represented by pixels having luminance and chrominance values. In addition to these values, a pixel of a video object has a binary shape value. This value is obtained from a rectangular picture by a segmentation process and is represented by one bit indicating if the pixel is in the object or not. The separate encoding of the video objects may enrich the user interaction in several multimedia services due to flexible access to the digital video data signal and an easy manipulation of the video information. In this framework, the encoder may perform a locally defined pre-processing aimed at the automatic identification of the objects appearing in a sequence of pictures.

The operation of segmentation aims at partitioning a rectangular picture or a video sequence of pictures into regions extracted according to a given criterion. FIG. 1 shows an example of a segmentation process in which a rectangular picture (RP) has been partitioned into several video objects (VO1 to VO4). In the case of a video sequence, this partition should achieve the temporal coherence of the resulting sequence of object masks representing the video object. Different methods have been proposed for segmentation of video sequences, based on either a spatial homogeneity, a motion coherence criterion or a spatiotemporal processing. These methods are expected to identify classes of moving objects according to the luminance homogeneity and the motion coherence criterion.

SUMMARY OF THE INVENTION

It is an object of the invention to provide a method of processing a digital video data signal so as to obtain a modified digital video data signal containing binary shape data.

To date, only pixel data transmission is standardized by the recommendation ITU-R BT.601-5. This recommendation specifies methods for digitally encoding video signal but does not propose or suggest any method for the transmission of the binary shape data.

The method of processing in accordance with the invention is characterized in that it comprises an identification step for identifying with an identifier to which video object of the segmented video data signals a pixel of the rectangular picture belongs, and an insertion step for inserting the identifiers into the digital video data signal so as to form a modified digital video data signal to be encoded by a video-object-based encoding framework.

Such a method of processing allows information relating to binary shape data to inserted into a digital video data signal by means of identifiers of video objects. As a consequence, the modified digital video data signal obtained by such a method of processing can be encoded directly by a video-object-based encoder and, more specifically, a hardware encoder.

In the preferred embodiment of the invention, the digital video data signal is defined by the recommendation ITU-R BT.601-5 and the identifiers are first inserted into an ancillary data packet as defined in the recommendation ITU-R BT.1364, which is then inserted into a vertical blanking space of the digital video data signal at a row level.

The present invention also applies to a processing device for implementing such a method of processing.

These and other aspects of the invention will be apparent from and elucidated with reference to the embodiments described hereinafter.

BRIEF DESCRIPTION OF THE DRAWINGS

The present invention will now be described, by way of example, with reference to the accompanying drawings, wherein.

DETAILED DESCRIPTION OF THE INVENTION

Figure 1:
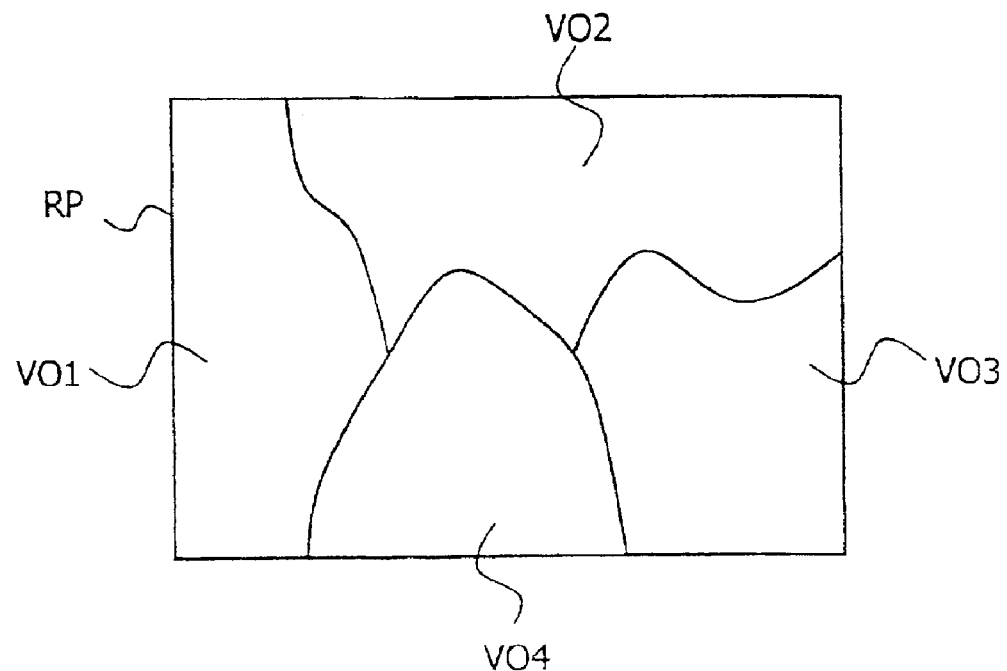
FIG. 1 shows an example of a segmented picture comprising various video objects.
Figure 2:
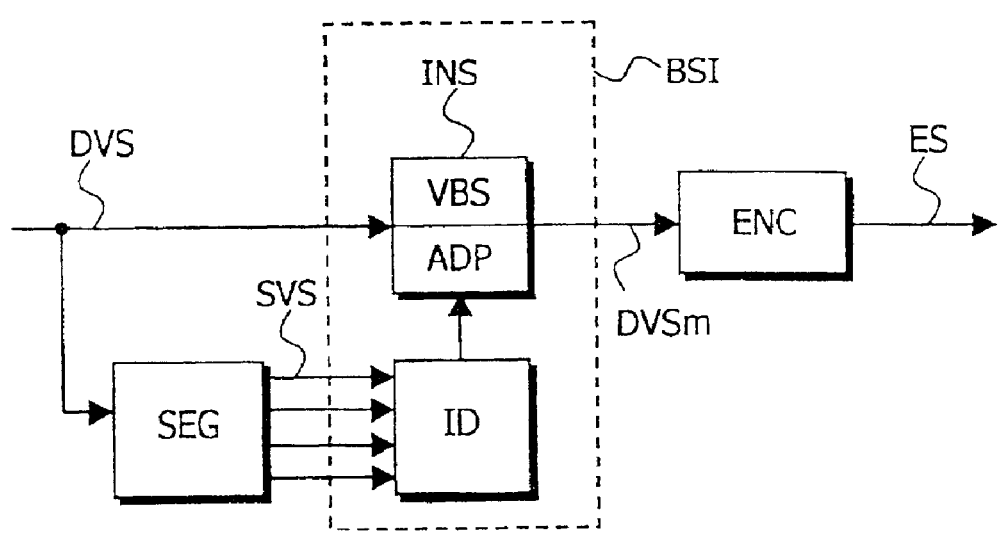
FIG. 2 is a block diagram of a method of processing in accordance with the invention.

The present invention aims at inserting binary shape data into a digital video data signal, the modified digital video data signal thus obtained being encoded directly by a video-object-based encoder. FIG. 2 is a block diagram illustrating the principle of a method of processing in accordance with the invention.

Such a method of processing processes a digital video data signal (DVS) containing data relating to rectangular pictures, and segmented video data signals (SVS) provided by a segmentation step (SEG) of the digital video data signal, a segmented video data signal containing a video object (VO) which is a region of the rectangular picture.

Said method of processing comprises the steps of:
- identifying (ID) with an identifier to which video object of the segmented video data signals (SVS) a pixel of the rectangular picture belongs,
- inserting (INS) the identifiers into the digital video data signal so as to form a modified digital video data signal (DVSm), and
- encoding (ENC) the modified digital video data signal using the MPEG-4 encoding standard so as to provide an encoded data signal (ES).

Figure 3:
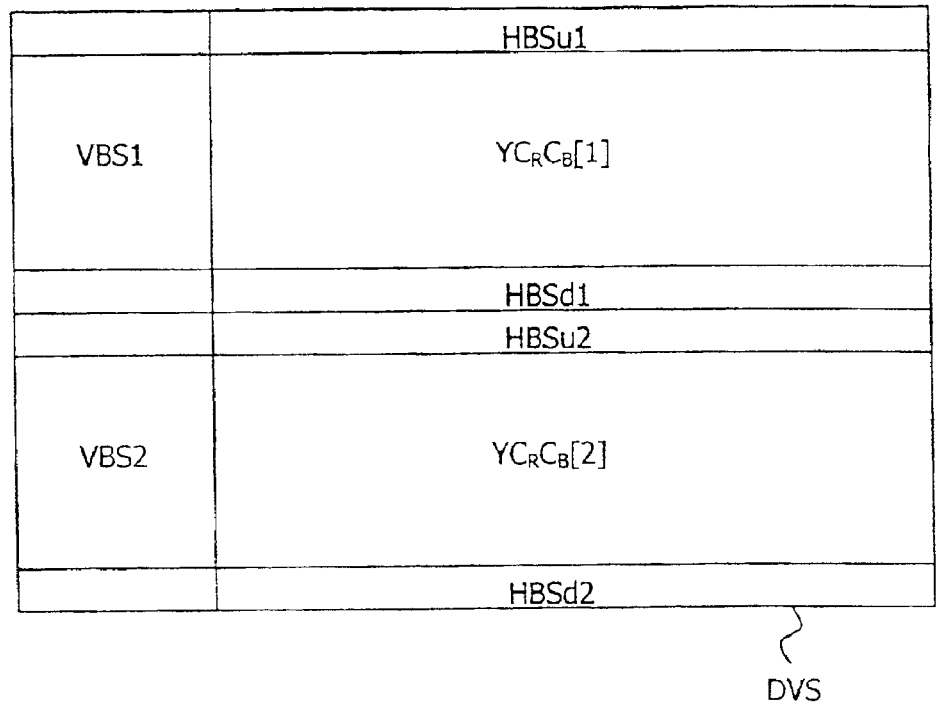
FIG. 3 represents a digital video data signal as defined by the recommendation ITU-R BT.601-5.

In the preferred embodiment of the invention, the digital video data signal (DVS) is the one defined by the recommendation ITU-R BT.601-5. FIG. 3 shows the structure of a digital video data signal as defined by said recommendation. Such a digital video data signal comprises:

video data ($YC_RC_B[1]$ and $YC_RC_B[2]$), comprising luminance samples (Y) and two simultaneous color-difference signals ($C_R$ and $C_B$), horizontal blanking spaces (HBSu1, HBSd1, HBSu2 and HBSd2), vertical blanking spaces (VBS1 and VBS2).

For example, in a 50 fields per second system, where the whole picture comprises 625 lines, the video data are divided into two fields comprising 288 lines each. The rest of the lines corresponds to the various horizontal blanking spaces.

If the sampling frequency is 13.5 MHz for the luminance signal, the sampling frequency is 6.75 MHz for each color difference signal in the 4:2:2 encoding format. The number of samples per total line is 864 for the luminance signal and 432 for each color-difference signal. These samples are encoded on 8 bits (optionally 10). As the number of samples per digital active line is 720 for the luminance signal and 360 for each color-difference signal, 288 samples at the maximum are available for the vertical blanking spaces.

The present invention is applicable to other formats of the digital video data signal as defined by the recommendation ITU-R BT.601-5, such as, for example, a 60 fields per second rate corresponding to a 525-line system, a 4:4:4 encoding format, or a sampling frequency of 18 MHz for the luminance signal.

The present invention is also applicable to other digital video data signals, such as, for example, the ones defined by the recommendation ITU-R BT.656, ITU-R BT.799, or ITU-R BT.1120 corresponding to HDTV signals.

Prior to processing by the processing method, the digital video data signal (DVS) should be segmented using a segmentation process (SEG), which results in several segmented video data signals (SVS). The segmentation process can be performed in two ways. The first one is based on a usual software method, such as the one depicted in the background of the invention, but takes quite a lot of time. The second one is much faster and is called the Chroma Key process. Such a process is dedicated to the extraction of at least two video objects, of which one is the background video. This background is preferably blue or green and such a segmentation process can be implemented in a hardware application.

Figure 4:
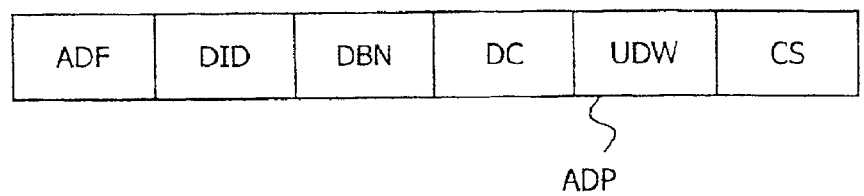
FIG. 4 represents an ancillary data packet as defined in the recommendation ITU-R BT.1364.

The identifiers of video objects are then inserted into the digital video data signal using ancillary data as defined in the recommendation ITU-R BT.1364. The ancillary data are carried in packets, each packet carrying its own identification. FIG. 4 shows an ancillary data packet as defined in the recommendation ITU-R BT.1364. Said ancillary data packet comprises:

an ancillary data flag (ADF) which is a fixed preamble that enables an ancillary data packet to be detected, a data identification word (DID) to enable packets carrying a particular type of ancillary data to be identified, a data block number (DBN) which is incremented by one for each consecutive data packet sharing a common data identification word and requiring continuity indication, a data count word (DC) to indicate the packet length, a user data word (UDW) which contains the ancillary data, up to 255 words in each packet, a checksum word (CD) used to determine the validity of the ancillary data packet from the data identification word through the user data word.

The recommendation ITU-R BT.1364 provides a mechanism for the transport of ancillary data signals through digital video component interfaces in the digital blanking portion of the digital video data signal. In the preferred embodiment of the invention, ancillary data packets are inserted into vertical blanking spaces (VBS1 and VBS2) of the digital video data signal (DVS) at a row level. Sufficient space is available for the entire packet to be accommodated within the same vertical blanking space.

Every pixel row or line represents 720 pixels and the size of the user data word shall not exceed 255 words or bytes. As a consequence, up to 4 video objects (VO) can be inserted into the digital video data signal (DVS). To this end, the method of processing in accordance with the invention comprises an identification step (ID) for identifying with an identifier to which video object of the segmented video data signals a pixel of the rectangular picture belongs. The video objects are encoded with an identifier having 2 bits. Therefore, 1440 bits, corresponding to 180 bytes, are necessary to fully describe a pixel row.

Said identifier makes it possible to determine to which video object the corresponding pixel belongs in the following manner:

00: the pixel belongs to the first video object (VO1),

01: the pixel belongs to the second video object (VO2),

10: the pixel belongs to the third video object (VO3),

11: the pixel belongs to the fourth video object (VO4).

The bytes of the user data word are numbered from 0 to 179. The eight bits of the byte numbered n contains the following information:

the bits 0 and 1 contain the identifier of the pixel $4n$, the bits 2 and 3 contain the identifier of the pixel $4n+1$, the bits 4 and 5 contain the identifier of the pixel $4n+2$, the bits 6 and 7 contain the identifier of the pixel $4n+3$.

Finally, the sub-step of inserting (ADP) the identifiers into an ancillary data packet combined with the sub-step of inserting (VBS) the ancillary data packet into a vertical blanking space, makes it possible to form a modified digital video data signal (DVSm) to be encoded directly by a video-object-based encoder.

It is to be noted that the use of the verb "to comprise" and its conjugations does not exclude the presence of any other steps or elements than those defined in any claim.

What is claimed is:

1. A method of processing a digital video data signal (DVS) containing data relating to rectangular pictures, said method of processing comprising a segmentation step (SEG) for segmenting the digital video data signal so as to provide segmented video data signals (SVS), a segmented video data signal containing a video object (VO) which is a region of the rectangular picture, said method of processing comprises:

an identification step (ID) for identifying with an identifier to which video object of the segmented video data signals a pixel of the rectangular picture belongs, and an insertion step (INS) for inserting the identifiers into the digital video data signal so as to form a modified digital video data signal (DVSm) to be encoded by a video-object-based encoding framework, wherein the digital video data signal is defined by the recommendation ITU-R BT.601-5 and the insertion step (INS) comprises a first sub-step of inserting (ADP) the identifiers into an ancillary data packet as defined in the recommendation ITU-R BT.1364, and a second sub-step of inserting (VBS) the ancillary data packet into a vertical blanking space of the digital video data signal at a row level.

2. A method of processing a digital video data signal (DVS) as claimed in claim 1, wherein the identification step (ID) is adapted to assign an identifier coded on two bits to a given pixel of the rectangular picture.

3. A device for processing a digital video data signal (DVS) containing data relating to rectangular pictures, said processing device comprising means for segmenting (SEG) the digital video data signal so as to provide segmented video data signals (SVS), a segmented video data signal containing a video object (VO) which is a region of the rectangular picture, said processing device comprises:

means for identifying (ID) with an identifier to which video object of the segmented video data signals a pixel of the rectangular picture belongs, and means for inserting (INS) the identifiers into the digital video data signal so as to form a modified digital video data signal (DVSm) to be encoded by a video-object-based encoding framework, wherein the digital video data signal is defined by the recommendation ITU-R BT.601-5 and the inserting means (INS) are adapted to first insert the identifiers into an ancillary data packet (ADP) as defined in the recommendation ITU-R BT.1364, which is subsequently inserted into a vertical blanking space (VBS) of the digital video data signal at a row level.

4. A processing device as claimed in claim 3, wherein the identifying means (ID) are adapted to assign an identifier coded on two bits to a given pixel of the rectangular picture.

5. A digital video data signal as defined by the recommendation ITU-R BT.601-5 comprising ancillary data packets as defined in the recommendation ITU-R BT.1364, an ancillary data packet being accommodated in a vertical blanking space of the digital video data signal at a row level, wherein the ancillary data packet comprises identifiers corresponding to video objects, said video objects resulting from a segmentation process of rectangular pictures contained in the digital video data signal.

* * * * *